No. 639,445. Patented Dec. 19, 1899.
S. SCHÖNFELD.
OIL FILTER.
(Application filed June 26, 1899.)
(No Model.)
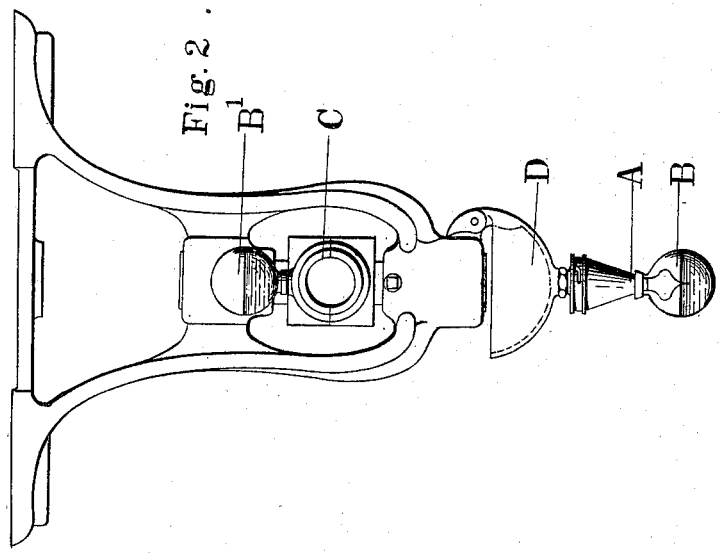
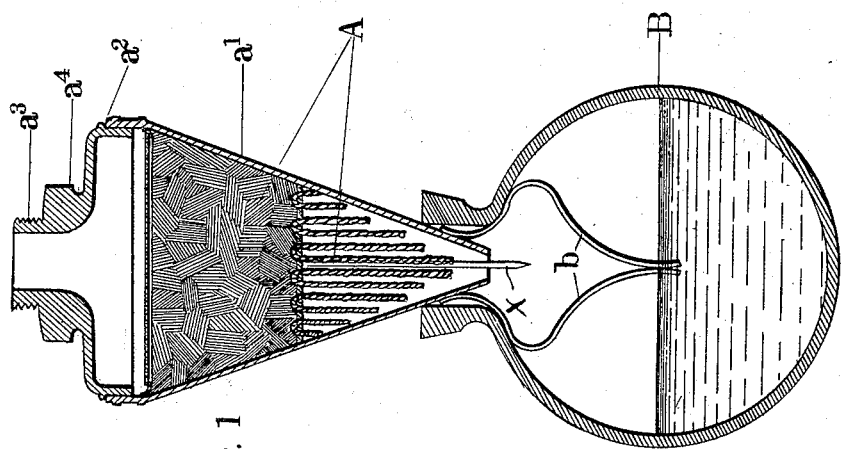
WITNESSES:
INVENTOR
Sigismund Schönfeld
BY
ATTORNEYS
THE NORRIS PETERS CO., PHOTO-LITHO., WASHINGTON, D. C.

UNITED STATES PATENT OFFICE.

SIGMUND SCHÖNFELD, OF BUDA-PESTH, AUSTRIA-HUNGARY.

OIL-FILTER.

SPECIFICATION forming part of Letters Patent No. 639,445, dated December 19, 1899.

Application filed June 26, 1899. Serial No. 722,101. (No model.)

*To all whom it may concern:*

Be it known that I, SIGMUND SCHÖNFELD, a subject of the Emperor of Austria-Hungary, residing at Buda-Pesth, Austria-Hungary, have invented certain new and useful Improvements in Oil-Filters, of which the following is a full, clear, and exact specification.

The object of the present invention consists of an oil-filter which can be fixed to the drip-trays of the bearing and which will filter the used and impure oil collected in the drip-tray and will allow the same to flow into a collecting vessel temporarily attached to the filter, from which the oil can from time to time be removed for the purpose of being used over again. As a suitable collecting vessel there may be conveniently used the glass receptacle of the ordinary automatic oiler, which receptacle can be again used as an oiler at any time by simply exchanging the empty oiler with the collecting vessel, and vice versa. By these means I obtain the result that the lubricating-oil is practically subjected to a cycle of purification and can be used over again without having the disadvantages found in filtering large quantities of oil.

In the accompanying drawings is illustrated a constructional form of my invention, in which a glass receptacle of an automatic oiler is used as the collecting vessel for the oil passing through the filter.

Figure 1 shows a vertical section of the filter with the collecting vessel attached thereto. Fig. 2 shows the application of this filter to an ordinary hanging bearing.

As may be seen from Fig. 1, the filter A is constructed in the form of a cone, with its apex downward, and having connected to the part $a'$ in any suitable manner—as, for instance, by a screw or bayonet-catch or the like—the part $a^2$, provided with the tubular threaded connecting-piece $a^3$ and the flange $a^4$. The part $a^3$ serves to attach the filter to the oil-catchers of cast-iron or the like usually employed, and the last-named part $a^4$ serves, when it is requisite, to secure the apparatus by soldering or the like to oil-catchers of tin-plate. In the interior of the cone $a'$ are arranged two perforated sieve-plates, between which the filtering material—as, for instance, the usual cotton wick, or a fabric, or cellulose, or the like—is placed. Through the apertures of the lower perforated plate are drawn loosely-twisted threads, and at the center of the plate there is, as in the self-oilers, a metal pin $x$ passing downward, which assures the regular drip of the oil which has passed through the filtering material and the perforated plates. The vessel B, serving to collect the filtered oil, can be attached to the filtering-cone in any desired manner. If the glass vessel of a self-oiler is used as the collecting vessel, it is most convenient to have a spring-clip $b$ on the filter, which can be pressed together so as to enable the glass vessel to be passed over it, but which would in the interior of the vessel again resume its original form, and thereby sustains the vessel.

As may be seen from Fig. 2, the oil passes in this apparatus from the lubricators fixed in the upper bearings into the shaft-bearing C. From this the oil passes into the collector D and finally flows through the filter A into the vessel B underneath, which serves as a collecting vessel. As soon as the oil has been used out of the vessel B' the vessel B is removed (the slight resistance of the spring $b$ being easily overcome) and is then put in the place of the vessel B', while this latter takes its place as collecting vessel under the bearing.

It will be seen that this device requires no expensive apparatus, while it secures a considerable saving in oil and labor.

I claim—

1. A filter comprising the upper and lower screens with the filtering material between them and the wicks having both ends passing through the openings in the lower screen, substantially as described.

2. In combination, the filtering-chamber, the screens therein, the filtering material between the screens, the wicks extending through the openings in the lower screen and the depending pin extending from the lower screen in between the wicks, substantially as described.

3. In combination, the filtering-chamber, the springs at the lower end thereof, and the catch-receptacle fitting over the lower end of the chamber and held thereto by the springs, substantially as described.

4. In combination with the collector D, a filter-chamber connected thereto, and a catch-receptacle secured removably to the filter-chamber, substantially as described.

In testimony that I claim the foregoing as my invention I have signed my name in presence of two subscribing witnesses.

SIGMUND SCHÖNFELD.

Witnesses:
 GROVE ARNOLD,
 LASO BARCS.